United States Patent [19]

Shelstad

[11] Patent Number: 4,937,005
[45] Date of Patent: Jun. 26, 1990

[54] FILTER ASSEMBLY

[76] Inventor: Richard J. Shelstad, 9100 N. Santa Monica Blvd., Bayside, Wis. 53217

[21] Appl. No.: 84,625

[22] Filed: Aug. 11, 1987

[51] Int. Cl.$^5$ .............................................. B01D 29/02
[52] U.S. Cl. ..................................... 210/785; 210/138; 210/351; 210/388; 210/412
[58] Field of Search ............... 210/285, 350, 351, 388, 210/389, 138, 384, 409, 411, 412; 55/293, 361

[56] References Cited

U.S. PATENT DOCUMENTS

| | | | |
|---|---|---|---|
| 3,262,568 | 7/1966 | Zehrbach | 210/785 |
| 3,841,488 | 10/1974 | Yessaian | 210/388 |
| 3,997,446 | 12/1976 | Nagakura | 210/350 |
| 4,022,694 | 5/1977 | Fruman | 210/350 |
| 4,439,317 | 3/1984 | Jarrell | 210/151 |
| 4,533,472 | 8/1985 | Verri et al. | 210/350 |

Primary Examiner—Michael S. Marcus
Assistant Examiner—Richard D. Jordan
Attorney, Agent, or Firm—Glenn A. Buse'

[57] ABSTRACT

The filter assembly includes a filter unit disposed in a vertical tank and includes a first end plate or drain head having an opening in fluid communication with a filtrate port in the tank, a longitudinally movable second end plate or compression head spaced in generally parallel relationship to the drain head and an elongated sleeve of flexible filter material, such as a woven fabric, connected to and extending between the drain and compression heads to define a filtrate chamber. When the filter tube is in an expanded or extended condition (filtering position), a portion of the fluid, such as a wash water from a vehicle washing facility, entering the tank passes through the filter tube into the filter chamber and the thus-filtered water exits therefrom through the filtrate port. Excess wash water in the tank overflows through an overflow outlet. When it is desired to remove materials collected on the outer surface of the filter, the compression head is moved toward the drain head to compress the filter tube (purge position), a portion of the filtered water in the filter chamber is forced back through the filter tube for back flushing and at least a substantial portion of the material dislodged from the filter tube is carried from the tank with the overflowing waste water. The compression head is periodically cycled between the filtering and purge positions at predetermined time intervals by a timer-controlled, fluid-actuated cylinder.

14 Claims, 1 Drawing Sheet

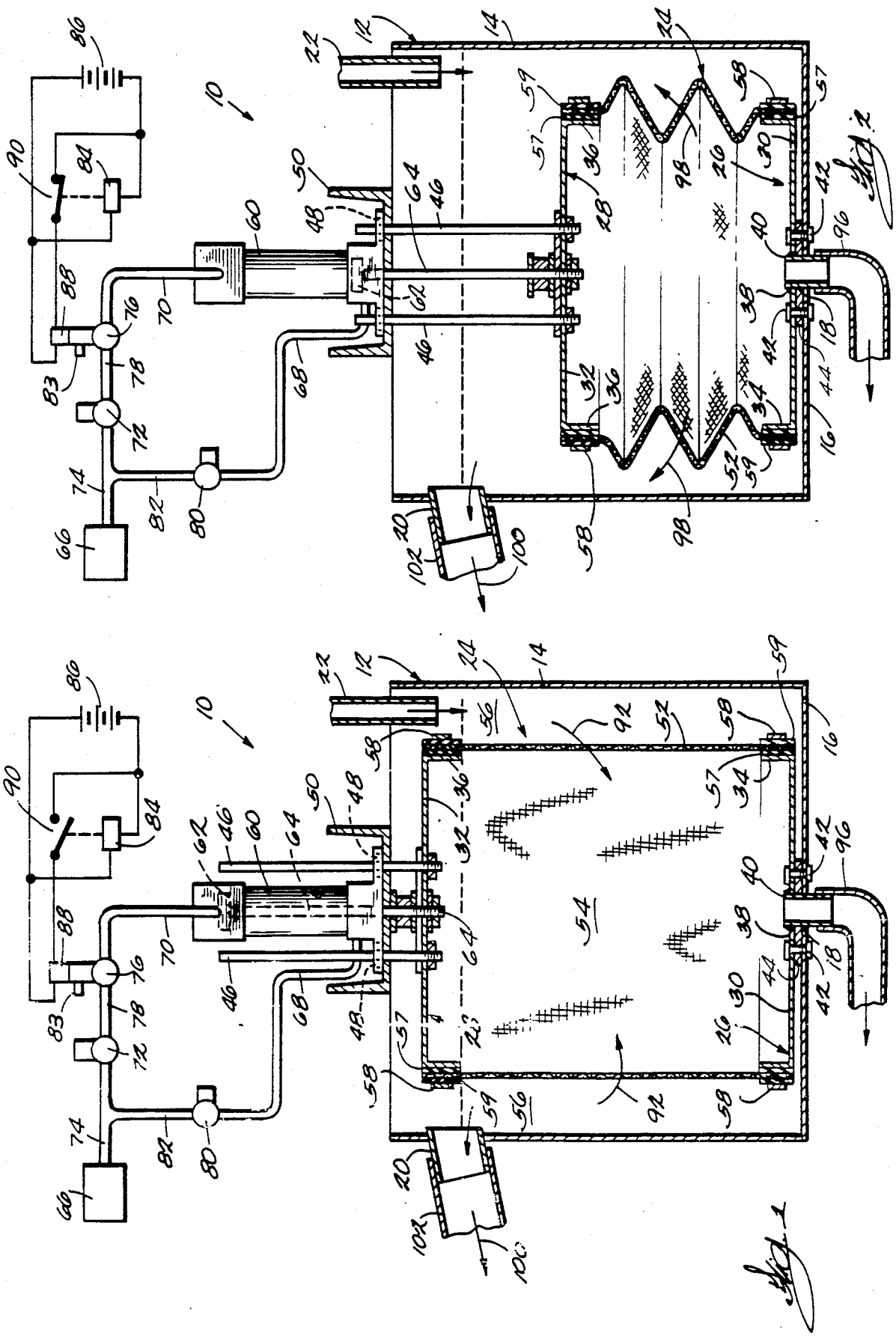

FILTER ASSEMBLY

BACKGROUND OF THE INVENTION

This invention relates to filter assemblies and, more particularly, to filter assemblies for removing relatively fine, suspended solid particles from a fluid such as a waste water.

Vehicle washing facilities typically include a system for reclaiming "dirty" wash water. These reclaim systems usually include a sump, pit or holding tank in which the "dirty" wash water is collected and heavy particles, such as sand, gravel, etc. settle out. Before reuse the partially clarified water is passed through some type of filtration apparatus, such as sand filters, centrifugal separators, etc., to remove fine suspended solid particles, such as leaves, cigarette paper, etc. which can clog the spray nozzles and other components in the washing equipment.

Sand filters include relatively complicated piping and valving for the periodic back flushings required for cleaning. Centrifugal separators do not effectively remove smaller, lighter weight particles. Both sand filters and centrifugal separators require one or more pumps larger than that required to draw water from the sump in order to create the head required to force the water through the sand bed(s) or generate the required centrifugal action. Consequently, in addition to a substantial initial investment, operating and maintenance costs can be quite high for such filtration apparatus.

Filtration assemblies including longitudinally collapsible flexible filter units have been used for different applications. Examples of such filtration assemblies are disclosed in U.S. Pat. Nos. 1,145,372 (Krause), 3,997,446 (Nagakura) and 4,062,773 (Leonard). However, such assemblies generally are much too complicated for reliable use in a wash water reclaim system and/or not arranged to be self-cleaning.

SUMMARY OF THE INVENTION

An object of the invention is to provide a simple filter assembly for effectively removing relatively fine, suspended solid particles from a fluid, particularly a waste water.

Another object of the invention is to provide such a filter assembly which is self-cleaning and has a minimum number of moving parts.

A further object of the invention is to provide such a filter assembly which can be operated by gravity flow.

Other objects, aspects and advantages of the invention would become apparent to those skilled in the art upon reviewing the following detailed description, the drawing and the appended claims.

The invention provides a filter assembly for removing relatively fine, suspended solid particles from a fluid including a tank and a filter unit disposed inside the tank. The filter unit includes a first end plate member having an opening in fluid communication with a filtrate outlet in a tank, a second end plate member spaced in generally parallel relationship from and mounted for longitudinal movement relative to the first end plate member and an elongated sleeve of flexible filter material connected to and extending between the end plate members to form a filter tube having an outer surface and cooperating with the end plate members to define a filtrate chamber spaced inwardly from the tank side wall. An actuator moves one or both of the end plate members between a filtering position wherein the filter tube is in an extended condition and a portion of the fluid entering the tank passes through the filter tube into the filtrate chamber and the filtered fluid flows therefrom through the filtrate outlet and a purge position wherein the end plates are closer together to compress the filter tube. This movement of the end plate member(s) is rapid enough to cause a portion of the filtrate in the filtrate chamber to be forced back through the filter tube for back flushing to dislodge solid particles collected on the outer surface thereof.

The tank preferably includes an overflow outlet through which excess fluid entering the tank overflows from the tank without passing through the filter tube and at least a portion of the solid particles dislodged from the filter tube during movement toward the purge position is carried from the tank with the overflow fluid.

In one embodiment, one end plate member is moved between the filter and purge positions by a fluid-actuated cylinder. Operation of the cylinder is automatically controlled, such as by a timer, to cycle the filter tube between the filter and purge positions at predetermined time intervals.

The flexible material preferably is a relatively small mesh, woven fabric.

BRIEF DESCRIPTION OF THE DRAWINGS

FIG. 1 is a partially sectioned, partially schematic view of a filter assembly embodying the invention, showing the filter tube in the filtering position.

FIG. 2 is a view similar to FIG. 1, showing the filter tube in the purge position.

DESCRIPTION OF THE PREFERRED EMBODIMENTS

While the filter assembly of the invention can be used in various applications for filtering relatively fine, suspended solid particles from a fluid, it is particularly adapted for use in filtering reclaimed water from a sump or the like in a vehicle washing facility and will be described in connection with that application.

Illustrated in the drawing is a filter assembly 10 including a generally cylindrical, vertical tank 12 having a side wall 14 and a bottom wall 16. In the specific construction illustrated, the tank 12 has an open top which serves as an inlet for recycled wash water, a filtrate outlet or port 18 centrally located in the tank bottom wall 16 through which filtered wash water flows as described below and an overflow outlet 20 in the upper portion of the tank side wall 14 through which excess wash water introduced into the tank 12 overflows.

In the wash bay of a vehicle washing facility, wash water containing a detergent, wax, oils, dirt, sand, gravel, etc. drains off vehicles onto the floor and flows through one or more trenches, collecting pipes or the like to a sump, pit or holding tank where it is allowed to stand long enough for heavier particles, such as sand, gravel, etc. to settle out. The partially clarified wash water containing relatively fine, suspended solid particles, such as leaves, cigarette papers, etc., is drawn from the sump or holding tank by a pump (not shown) and prior to being recycled for reuse, is introduced into the open top of the tank 12 via a hose 22 or other suitable conduit.

Disposed inside the tank 12 is a filter unit 24 including a first end plate member or drain head 26 and a second end plate member or compression head 28 disposed in generally parallel, spaced relationship. The drain head 26 and the compression head 28 have respective circular or disc-like, rigid central portions 30 and 32 and respective circumferentially extending inturned flanges 34 and 36.

The drain head 26 includes an opening in fluid communication with the filtrate port 18 in the tank 12. In the specific construction illustrated, the disc-like portion 30 of the drain head 26 has a centrally located opening 38 in which a nipple 40 is mounted. The nipple 40 extends through the tank filtrate port 18 and the drain head 26 is sealingly mounted on the tank bottom wall 16 via bolts 42 and an elastomeric gasket 44 surrounding the filtrate port 18 and the nipple 40 and sandwiched between the tank bottom wall 16 and the disc-like portion 30 of the drain head 26.

Longitudinal movement of the compression head 28 relative to the drain head 26 is guided by a pair of vertical rods 46 mounted on the disc-like portion 32 of the compression head 28 and slidably extending through bushings 48 on a diametrically extending channel-shaped strut 50 supported on the top edge of the tank side wall 14.

The filter unit 24 also includes an elongated sleeve of flexible filter material connected to and extending between the drain head 26 and the compression head 28 to form a filter tube 52 which defines an interior filtrate chamber 54 and an annular inlet chamber 56 between the filter tube 52 and the tank side wall 14. The upper and lower ends of the filter tube 52 are held in place between a pair of rubber bands 57 and 59 which are clamped together and against the flanges 34 and 36 by an outer hoop-like strap 58 including a suitable circumferentially adjustable clamping means (not shown), such as a worm-drive clamp. The rubber bands 57 and 59 prevent the edges of the flanges 34 and 36 and the straps 58 from cutting and/or causing excessive wear to the filter materials when the filter tube 52 is moved between the filtering and purge positions.

Actuation means are provided for longitudinally moving the compression head 28 and the drain head 26 relative to each other between a filtering position illustrated in FIG. 1 where the filter tube 52 is in an expanded or extended condition and a purge position illustrated in FIG. 2 where the filter tube 52 is in a partially collapsed or compressed condition.

While various other suitable means can be used, in the specific construction illustrated, the actuation means include an air-actuated cylinder 60 mounted on the support strut 50 and including a piston 62 carrying a piston rod 64 which extends through an aperture in the support strut 50 and is suitably connected to the disc-like portion 32 of the compression head 28. Pressurized air from a suitable source 66 is supplied to the rod end of the cylinder 60 through a conduit 68 to retract the piston rod 64 and is supplied to the base end of the cylinder 60 through a conduit 70 to extend the piston rod 64. Retraction of the piston rod 64 moves the compression head 28 away from the drain head 26 or toward the filter position to extend or expand the filter tube 52. Extension of the piston rod 64 moves the compression head 28 toward the drain head 26 or toward the purge position to compress the filter tube 52.

Operation of the cylinder 60 is controlled by a control system including a high pressure regulator 72 connected to the pressurized air source 66 via a conduit 74, a solenoid-operated, three-way valve 76 which is connected to the high pressure regulator 72 via a conduit 78 and to the base end of the cylinder 60 via the conduit 70. The control system also includes a low pressure regulator 80 connected to the pressurized air source 66 via a conduit 82 and the conduit 74 and connected to the rod end of the cylinder 60 via the conduit 68.

The low pressure regulator 80 is set at a pressure (e.g., 50 psi) sufficient to move the piston 62 to the filtering position and maintain it in that position when the base side of the piston 62 is vented to the atmosphere. The rod side of the piston 62 is not vented to atmosphere and pressure is continuously applied thereon via the low pressure regulator 80 and the conduit 68. The high pressure regulator 72 is set at a pressure (e.g., 90 psi) high enough to overcome the pressure force continuously applied on the rod side of the piston and move the piston 62 to the purge position. By using two pressure regulators set at different pressures, it is necessary to control the admission and exhaustion of pressure on only one side of the piston, thereby eliminating the need for complicated valving and the associated electrical circuitry.

The valve 76 is movable between a first or filtering position to vent the base end of the cylinder 60 via the conduit 70 and a vent port 83 on the valve and a second or purge position to supply pressurized air from the high pressure regulator 72 to the base end of the cylinder 60 via the conduits 78 and 70.

While the valve 76 can be operated manually by a suitable switch, the control system preferably includes a timer 84 electrically connected to an electrical power source 86 and to the solenoid 88 of the valve 76. At set time interval, e.g., every 15 minutes, the timer 84 closes a normally open switch 90 and the solenoid 88 is energized to move the valve 76 to the purge position. The filter tube 52 is compressed and particles are dislodged from the outer surface thereof as described above.

The timer 84 can be arranged to sequentially open and close the switch 90 a number of times at intervals of 5 seconds or so to cycle the valve 76 between the filtering and purge positions a like number of times during a purge cycle of a predetermined time duration, e.g., 5 minutes. Other suitable means can be used to automatically control the operation of the cylinder to provide such a purge cycle.

When the compression head 36 is in the filtering position, wash water, introduced into the open top of the tank 12, fills the annular inlet chamber 56 and, as the wash water passes by gravity through the filter tube 52 illustrated by arrows 92, solid particles are filtered therefrom. As illustrated by arrows 94, filtered water flows from the filtrate chamber 54 through the nipple 40 and a hose 96 or other suitable conduit connected to a holding tank or directly to the washing equipment.

The disc-like portion 32 of the compression head 26 preferably is substantially imperforate and the disc-like portion 30 of the drain head 26 preferably is imperforate except for the opening 18. As the compression head 28 is moved toward the purge position, it is moved at a speed rapid enough for a portion of the filtrate in the filtrate chamber 54 to be forced back through the filter tube 52 as illustrated by arrows 98. The resulting back flushing action dislodges solid particles collected on the outer surface of the filter tube 52. The time period for the purge cycle and the number of times the compression head 28 is cycled between the filtering and purge positions can be adjusted to obtain maximum cleaning.

To facilitate removal of the dislodged particles from the tank, the inflow of wash water preferably is regulated so that it is greater than the outflow of filtered water from the filtrate chamber 54 and, as illustrated by arrow 100, the excess water in the annular inlet chamber 56 overflows through the overflow outlet 20 which can be connected to the sump, pit or holding tank via a hose 102 or other suitable conduit. During the purge cycle, the overflowing waste water carries at least a substantial portion of the dislodged particles out through the overflow outlet 20 and back to the sump, pit or holding tank.

The flexible filter material preferably is a woven fabric of natural or synthetic fibers having a mesh size appropriate for the nature of the fluid and particles being filtered. A particularly suitable commercially available filter material capable of removing particles as small as 60 microns from a wash water from a vehicle washing facility is a so-called precap woven polyester material marketed by Tetko Incorporated, Elmsford, N.Y. under the designation 7-60/42XX. Larger mesh size material, e.g., 80 and 100 micron, can be used for higher flow volumes.

Woven fabric filtered materials generally are capable of handling oils and waxes. The wash water from a vehicle washing facility normally contains some detergent which assists in removing oils and waxes on the outer surface of the filter tube when the wash water is back flushed during the purge cycle. For other applications or occasions when excessive amounts of oil and/or waxes have collected on the filter tube, additional detergent can be added to the inflowing wash water. In some cases, it may be necessary to cycle the filter tube more often or a larger number of times in order to maximize removal of oils and waxes.

A filter assembly embodying the invention has several advantages. The only moving parts is a single fluid-actuated cylinder and a single filter unit which can be automatically controlled to provide self cleaning at predetermined time intervals by a single timer or similar conventional control. Filtration is effected by gravity, so there is no need for higher pressure pumps like those required for sand filters or centrifugal separators. The filter unit can employ a woven fabric filter material which is substantially 100% effective in removing fine particles (e.g., as small as 60 microns and even smaller) not ordinarily removed by centrifugal separators. Such filter materials can handle oils and waxes without plugging and oils and/or waxes can be removed by the wash water during the purge cycle, with or without additional detergent. The assembly can be made quite compact. For example, a filter assembly capable of handling up to 100 gallons per minute of wash water can be as small as 2½ feet wide and 4 feet high.

From the foregoing description, one skilled in the art can easily ascertain the essential characteristics of the invention and, without departing from the spirit and scope thereof, make various changes and modifications to adapt it to various usages.

I claim:

1. A filter assembly for removing relatively fine, suspended solid particles from a fluid comprising
a tank having a side wall and a filtrate outlet, a filter unit disposed inside said tank and including a first end plate member having an opening in fluid communication with said filtrate outlet, a second end plate member spaced in generally parallel relationship from and mounted for longitudinal movement relative to said first end plate member and an elongated sleeve of flexible filter material connected to and extending between said first and second end plate members to form a filter tube having an outer surface and cooperating with said first and second end plate members to define a filtrate chamber spaced inwardly from said tank side wall; and
actuation means for moving at least one of said plate members relative to the other between a filtering position wherein said filter tube is in an extended condition and a portion of the fluid introduced into said tank passes through said filter tube into said filtrate chamber and the resulting filtrate flows from said filtrate chamber through said filtrate outlet and a purge position wherein said first and second end plate members are closer together to compress said filter tube, said actuation means being operable to move said at least one end plate member from the filter position toward the purge position rapid enough to cause a portion of the filtrate in said filtrate chamber to be forced back through said filter tube to dislodge solid particles collected on the outer surface thereof; and
means for removing from said tank a portion of the fluid which is introduced into said tank and in which at least a portion of the dislodged solid particles is carried from said tank.

2. A filter assembly according to claim 1 wherein said removing means includes an overflow outlet in said tank through which excess fluid introduced into said tank overflows from said tank without passing through said filter tube and at least a portion of the dislodged solid particles is carried from said tank in the fluid flowing through said overflow outlet.

3. A filter assembly according to claim 2 wherein
said tank is vertical and has a bottom wall;
said filtrate outlet is in said bottom wall and said first end plate member is located adjacent to said bottom wall; and
said overflow outlet is in said tank side wall.

4. A filter assembly according to claim 1 wherein said actuation means includes
a fluid-actuated cylinder including a reciprocative piston operably connected to one of said end plate members;
a source of pressurized fluid; and
control means for connecting said cylinder in communication with said source and controlling the flow of pressurized fluid to opposite sides of said piston.

5. A filter assembly according to claim 4 wherein said control means includes
first conduit means for connecting said source in communication with one side of said piston to move said piston in a first direction for extending said filter tube; and
second conduit means including valve means for selectively connecting the opposite side of said piston in communication with said source to move said piston in a second direction for compressing said filter tube.

6. A filter assembly according to claim 5 wherein said valve means is movable between a first position wherein said opposite side of said piston is connected in communication with the atmosphere and a second position wherein said opposite side of said piston is connected in communication with said source; and said control means includes means for moving said valve means between the first and second positions at predetermined time intervals.

7. A filter assembly according to claim 6 wherein
said first conduit means includes a first pressure regulator set at a first pressure level; and said second conduit means includes a second pressure regulator set at a second pressure level high enough above said first pressure level to move said piston in the second direction when pressure at said first pressure level is applied to said one side of said piston.

8. A filter assembly according to claim 7 wherein
said tank is generally cylindrical, said first and second end plate members are circular and, when in the filter position, said filter tube is generally cylindrical and an annular chamber is defined between said outer surface thereof and said tank side wall.

9. A filter assembly according to claim 1 wherein said filter material is a woven fabric.

10. A filter assembly for removing relatively fine, suspended, solid particles from a fluid comprising
a vertical, generally cylindrical tank including a bottom wall having a filtrate outlet and a side wall having an overflow outlet;

a filter unit disposed inside said tank and including a first circular end plate member having an opening in fluid communication with said filtrate outlet, a second circular end plate member spaced in generally parallel relationship from and mounted for longitudinal movement relative to said first end plate member and an elongated sleeve of flexible filter material connected to and extending between said first and second end plate members to form a filter tube having an outer surface and cooperating with said first and second end plate members to define a generally cylindrical filtrate chamber spaced inwardly from said side wall; and actuation means for longitudinally moving said second end plate member relative to said first end plate member between a filtering position wherein said filter tube is in an extended condition and a portion of the fluid introduced into said tank passes through said filter tube into said filtrate chamber, the resulting filtrate flows from said filtrate chamber through said filtrate outlet, and another portion of the fluid introduced into said tank overflows through said overflow outlet without passing through said filter tube and a purge position wherein said first and second end plate members are closer together to compress said filter rube, said actuation means being operable to move said second end plate member from the filter position toward the purge position rapid enough to force a portion of the filtrate in said filter chamber back through said filtrate tube to dislodge solid particles collected on the outer surface thereof and at least a portion of the dislodged solid particles is carried from said tank in the fluid overflowing through said overflow outlet.

11. A filter assembly according to claim 10 wherein said actuation means includes a fluid-actuated cylinder including a reciprocative piston carrying a piston rod connected to said second end plate member;

a source of pressurized fluid;

first conduit means for connecting said source in communication with one side of said piston to move said piston in a first direction for moving said filter tube to the filter position;

second conduit means including valve means selectively movable between a first position to connect the opposite side of said piston in communication with the atmosphere and a second position to connect the opposite side of said piston in communication with said source to move said piston in a second direction for compressing said filter tube; and means for moving said valve means between the first and second positions at predetermined time intervals.

12. A filter assembly according to claim 11 wherein
said first conduit means includes a first pressure regulator set at a first pressure level; and said second conduit means includes a second pressure regulator set at a second pressure level high enough above said first pressure level to move said piston in the second direction when pressure at said first pressure level is applied to said one side of said piston.

13. A method for filtering relatively fine, suspended, solid particles from a fluid comprising the steps of
introducing the fluid into a tank having a filtrate outlet and a filter unit including a first end plate member having a filtrate outlet in fluid communication with the filtrate outlet, a second end plate member spaced in generally parallel relationship from and mounted for longitudinal movement relative to the first end plate member and an elongated sleeve of flexible filter material connected to and extending between the first and second end plate member and cooperating therewith to define a filtrate chamber spaced inwardly from the tank walls;

moving the end plate members longitudinally relative to each other to a filtering position wherein the filter tube is in an extended condition;

passing the fluid by gravity through the filter tube into the filtrate chamber;

withdrawing the resulting filtrate from the filtrate chamber through the filtrate outlet;

periodically longitudinally moving the end plate members toward each other rapidly enough to cause a portion of the filtrate in the filtrate chamber to be forced back through the filter tube and dislodge solid particles collected on the outer surface thereof and thereafter returning the end plate members to the filtering position; and removing from the tank a portion of the fluid which is introduced into the tank and in which at least a portion of the dislodged solid particles is carried from the tank.

14. A method according to claim 13 including the steps of
introducing the fluid into the tank at a rate greater than the rate at which the filtrate is removed from the tank; and overflowing from the tank the excess fluid introduced into the tank such that at least a portion of the dislodged solid particles is carried from the tank in the overflowing excess fluid.

* * * * *

UNITED STATES PATENT AND TRADEMARK OFFICE
CERTIFICATE OF CORRECTION

PATENT NO. : 4,937,005
DATED : June 26, 1990
INVENTOR(S) : Richard J. Shelstad It is certified that error appears in the above-identified patent and that said Letters Patent is hereby corrected as shown below:

Column 6, line 7, delete "and".

Column 6, line 8, after "said" insert ---end---.

Column 7, line 53, the word "rube" should read ---tube---.

Title of patent should read ---BACKFLUSH FILTER ASSEMBLY---.

Signed and Sealed this

Eighteenth Day of June, 1991

*Attest:*

*Attesting Officer*

HARRY F. MANBECK, JR.

*Commissioner of Patents and Trademarks*